United States Patent [19]

Kaneda

[11] Patent Number: 4,621,917
[45] Date of Patent: Nov. 11, 1986

[54] AUTOMATIC FOCUSING ADJUSTMENT DEVICE

[75] Inventor: Naoya Kaneda, Kanagawa, Japan

[73] Assignee: Canon Kabushiki Kaisha, Japan

[21] Appl. No.: 772,768

[22] Filed: Sep. 5, 1985

[30] Foreign Application Priority Data

Sep. 7, 1984 [JP] Japan .................................. 59-187316

[51] Int. Cl.[4] ................................................ G03B 3/00
[52] U.S. Cl. .................................................... 354/403
[58] Field of Search ............................ 354/403; 356/1; 250/201 AF

[56] References Cited

U.S. PATENT DOCUMENTS

| 4,065,778 | 12/1977 | Harvey | 354/403 |
| 4,251,144 | 2/1981 | Matsuda et al. | 354/403 |
| 4,441,810 | 4/1984 | Momose et al. | 354/403 X |
| 4,451,729 | 5/1984 | Takagi et al. | 354/403 X |
| 4,464,038 | 8/1984 | Nanba | 354/403 |

*Primary Examiner*—William B. Perkey
*Attorney, Agent, or Firm*—Toren, McGeady, Stanger, Goldberg & Kiel

[57] ABSTRACT

An automatic focusing adjustment device in which light is projected to an object to be photographed and its reflection is passed to a sensor having three image receiving areas, whereby a signal from the central area is computed with each of signals from the flanked areas to form focusing adjustment.

2 Claims, 22 Drawing Figures

F I G. 12
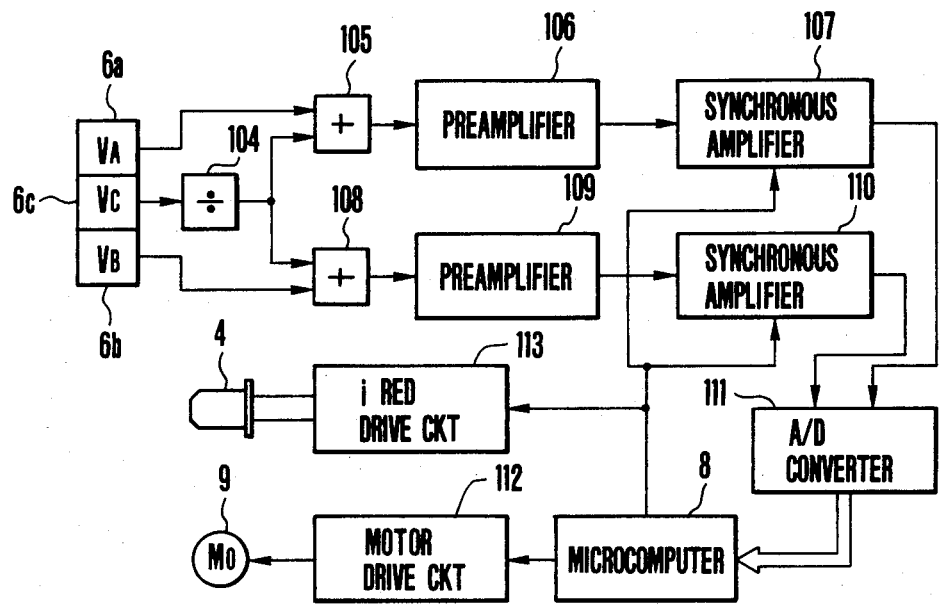
F I G. 13
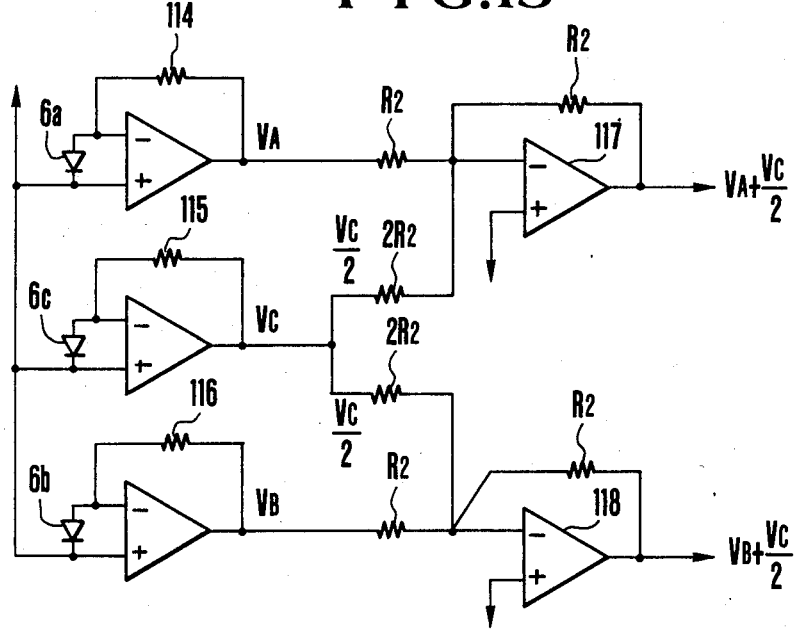

AUTOMATIC FOCUSING ADJUSTMENT DEVICE

BACKGROUND OF THE INVENTION

1. Field of the Invention

This invention relates to automatic focusing adjustment devices and, more particularly, to automatic focusing adjustment devices using the so-called difference active type range finder in which light is projected onto an object to be photographed and its reflection is passed to the area-divided photosensitive element.

2. Description of the Prior Art

There have been many previous proposals for automatically adjusting the position of the photographic lens or image pickup device in accordance with the object distance measured by the range finder so that an image of an object to be photographed is brought into sharp focus.

Of these, the typical one is that light of particular pattern is projected onto the object, and the reflected light from the object is detected by two image receiving areas of a sensor, wherein the object distance is determined based on the difference between the outputs of the two areas, or the so-called difference active type range finder is employed. Although the accuracy of focusing adjustment is relatively high even though the structure is simple, this type of range finder has a problem in that the reliability is considerably lowered for objects of differing reflectivities from part to part, or of differing contrast.

This problem will next be analyzed by reference to the drawings. FIGS. 1 and 2 illustrate a camera equipped with the prior known automatic focusing adjustment device employing the difference active type range finder. Near infrared light from a semi-conductor laser or like light emitting element 4 is projected by an aspherical molded lens 3 onto an object 1 where the projected light takes a spot-like form. This light spot is reflected from the object 1 to an aspherical molded collection lens 5 by which an image of the spot is formed on a sensor 6, for example, SPC, having two image receiving areas 6a and 6b.

In the in-focus condition as shown in FIG. 1, the center of the round spot image on the sensor 6 takes its place at the boundary line between the two areas 6a and 6b. Letting A denote the output of the first area 6a and B the output of the second area 6b, we have $A-B=0$.

Upon detection of when the outputs A and B coincide with each other (in actual practice their difference falls below a certain level), an image of the object 1 on the film plane, image pickup tube, or device is determined to be sharply focused.

As the object 1 moves toward the camera, the spot image on the sensor 6 shifts toward the area 6b as shown in FIG. 2. After the outputs A and B have been amplified and integrated by a signal processing circuit 7, when the former is subtracted by the latter, the difference between the outputs A and B is found negative, indicating a far-focus condition. A microcomputer 8 controls the operation of an electric motor 9 in accordance with the magnitude and sign of the output of the signal processing circuit 7 so that a focusing component 2 of the photographic lens along with the light emitting element 4 and sensor 6 moves forward or in a direction indicated by the arrow. Then, when $A-B=0$ is reached, the motor 9 stops. Thus, the in-focus condition is established again with respect to the new object distance. For note, in actual practice, by considering the presence of noise, there is provided a blind zone K permitting $|A-B|<K$ to be taken as being in-focus.

FIG. 3 illustrates another example of the prior known difference active type range finder employed in a different type camera from that of the camera of FIGS. 1 and 2. While the optical system of the range finder of FIGS. 1 and 2 is entirely independent of the photographic optical system, the light projection optical system of FIG. 3 is constructed with common parts of the photographic optical system. this provides the advantage that the camera of FIG. 3 is generally superior in compactness to that of FIGS. 1 and 2.

The light source 4 is positioned at an optically equivalent point to the axial point on the focal plane of the photographic lens system. Therefore, a sharp image of the light source 4 is formed in the object space at a distance to which the focusing member 2 is focused. Rays of light from the light source 4 are collimated by a lens 3 and then reflected by a dichroic mirror 13 which reflects only a nonharmonic region of wavelengths to the ambient light. A light beam from the mirror 13 has its axis in coincidence with the optical axis and passes through a zoom section 12 and the focusing component 2, being projected into the object space. While, in the example of FIGS. 1 and 2, the light source 4 (or the projection lens 3 as the case may be) is made movable along with the focusing lens 2, this is not necessary in the example of FIG. 3. For note, R0 in FIG. 3 denotes the distance in the base line of the trigonometrical survey.

FIG. 4 illustrates still another example of arrangement of the difference active type range finder relative to the photographic lens of the camera. In this case, the light source 4 and sensor 6 are positioned at respective optically equivalent points to the axial point on the focal plane of the photographic lens 2.

All the above-described kinds of range finders of the difference active type have a common problem that the distance measurement operates with decreasing reliabilities as the range of reflectivities of the object increases. Taking the example of FIGS. 1 and 2 as representative, this problem is next explained in greater detail.

The range finders of the difference active type have generally so far been designed on the major premise that the geometrical center of the light spot image on the sensor coincides with the center of power.

It is, however, obvious that the sensor 6 produces different outputs for objects of different distribution of reflectivity, despite the fact that these objects lie at an equal distance to one another. If that area of the object which is illuminated with the projected light is uniform in reflectivity, therefore, no particular problem arises. But, if the distribution of reflectivity over that area is not uniform, the aforesaid rule of design can no longer stand. In this connection, discussion will next be made by reference to FIGS. 5 and 6.

In FIG. 5, an object 10 has its upper half surface of high reflectivity and its lower half surface of low reflectivity, and the photographic lens is assumed to be initially just focused on that object. When the automatic focusing adjustment device is then rendered operative, however, an out-of-focus signal is produced, because $A-B<0$. As a result, the motor 9 is energized to move the focusing lens component 2, light source 4 and sensor 6 in a direction indicated by the arrow. In more detail, the reflected light from the high reflective upper half of the illuminated area on the object 10 falls in the second domain 6b, and that from the low reflective lower half in the first domain 6a. Although the geometrical center of the spot image on the sensor 6 takes its place at the boundary line between the domains 6a and 6b, their outputs differ from each other as B>A, causing the range finder to give a signal representing a far-focus condition to the automatic focusing adjustment device.

FIG. 6 illustrates an automatically adjusted focusing position where $A-B=0$ in contradiction to the fact that the geometrical center of the area of the spot image on the sensor 6 lies in the domain 6a. Thus, the apparent object distance y2 is shorter than the true one y1.

The use of such a conventional range finder of the difference active type in the automatic focusing adjustment device led to a disadvantage of lowering the reliability of focusing adjustment for so-called contrast pattern objects. This disadvantage can be reduced to some extent by decreasing the size of area of the light spot, but cannot be brought to naught, since there is a fundametal background. Also, if the size of the area of the light spot is unduly largely descreased, an alternative problem arises that when actually built in the camera, the distance adjusting ring is caused to excurse very frequently, although the precision accuracy of distance measurement is improved.

Another method of reducing the aforesaid disadvantage is to increase the base line length of the trigonometrical survey, or the distance between the light source and the sensor. Since the light source and the sensor are arranged so as to increase the base line length until that disadvantage becomes negligible, as the manageability and the flexibility of design must be largely sacrificed, this method has little value in actual practice.

How much discrepancy is produced between the actual and measured object distances for the contrast pattern object is next considered, for it constitutes the principle of the present invention.

In FIG. 7(b), an infrared spot image 101 on the sensor is assumed to have a radius of unity. A hatched or left hand half and slightly more area of the spot image 101 comes from that portion of the object which has a unit of reflectivity for the infrared light, while a right hand or white area of the circle 101 represents a larger value, k, of reflectivity than unity (1<k). (The term "value of reflectivity" herein used means that this value is measured in respect to the wavelength of the projected light). The abscissa is in the distance of a line, l, at which the intensity of light changes from the center 0 of the circle 101 as an original point. G denotes the center of light intensity. The integrated light intensity over that area of the circle 101 which lies on the left hand side of a vertical line passing the point G is equal to that over the other area on the right hand side. The distance from the center 0 of the circle 101 to the center G of light intensity varies as a function of deviation of the line, l, from the geometrical center 0. In the case of k=8, this function is depicted in FIG. 7(a). This curve tells that when the position of the brightness boundary line l comes to 0.6, the distance E takes a maximum value of about 0.7. As a matter of course, for l=1, or l=−1, that area of the object which is illuminated with the projected light is uniform in reflectivity, and, therefore, E=0. Accordingly, the contrast dependent defocused quantity can be evaluated in terms of E.

Here, let us relate various points in the curve of FIG. 7(a) to the real situations. In FIG. 7(c), a circular infrared spot image 101 is obtained from an object of uniform high reflectivity. Because the intensity of light is uniformly distributed over the entire area of the circle 101, the center of the circle 101, or the geometric center 0 of the spot image coincides with the center of light intensity G1, or the distance between the geometrical center 0 and the center G1 of light intensity takes a value E1 of zero.

In FIG. 7(d), as the boundary line of reflectivity enters the spot of illumination, for the line l is positioned at −0.5 with the hatched area of low light intensity and the remaining or white area of high intensity, the center of light intensity G2 splits from the geometrical center 0 to the right by a distance E2.

As the line l further invades to l=0 and l=+0.5 shown in FIGS. 7(e) and 7(f) respectively, the center of light intensity G is shifted progressively farther from the geometrical center 0, taking values G3 and G4 respectively with the distance E at E3 and E4.

Then when all the area of the circle 101 is uniformly low in light intensity, as shown in FIG. 7(g), the reflection signal strength center G5 shifts backward to coincide with the geometrical center 0 with the distance E becoming zero again (or E5=0). By plotting the values of distance E1 to E5 in the ordinate with respect to the values of l, and connecting the points successively, the curve of FIG. 7(a) is obtained.

How the contrast dependent defocused quantity E affects the output of the sensor when the number of image receiving areas is two is next discussed by reference to FIGS. 8(a) and 8(b).

When an infrared light spot image which is first assumed to be of uniform intensity sweeps the domains A and B of the sensor past positions (a), (b) and (c) successively, (VA−VB)/(VA+VB) where VA and VB are the outputs of the domains A and B of the sensor respectively varies as shown by solid lines in FIG. 8(a). When the geometrical center 0 of the spot image 101 comes across the boundary line between the domains A and B of the sensor, (VA−VA)/(VA+VB) (hereinafter referred to as AF signal) becomes zero. Therefore, no focusing misadjustment by contrast is formed.

For another spot image of contrast pattern with l≈0.6 and k=8, as shown in FIG. 8(b), variation of the value of the AF signal with variation of the position of the spot image past (a)→(b)→(c) is shown by a dashed curve in FIG. 8(a). This curve crosses the X-axis at a distance Δx from the original point, the cross point corresponding to the position (b) of the spot image in FIG. 8(b). It is to be noted here that the signal strength center G lies just on the boundary line between the domains A and B of the sensor. This means that E of FIG. 7(a) corresponds to Δx of FIG. 8(a). That is, the AF signal becomes zero when the spot image is deviated by E. The defocused amount, Δb, on the focal plane may be expressed by $\Delta b = \Delta x \cdot f^2/(L \cdot fs)$ where f is the focal length of the photographic lens, L is the base line length of trigonometrical survey and fs is the focal length of the collection lens. The range of focusing misadjustment is proportional to Δx, and increases with increase in the contrast rate k, as the maximum value of FIG. 7(a) moves to the right upward.

SUMMARY OF THE INVENTION

An object of the invention is to reduce the above-described drawback unavoidably associated with the difference active type.

A feature of the invention is that the sensor having two image receiving areas necessary to the aforesaid difference active type range finder is provided with a third image receiving area intervening between those two areas, whereby the signal component from the third area is computed with the signal components from the other two areas to remove the aforesaid drawback.

BRIEF DESCRIPTION OF THE DRAWINGS

FIG. 12 is a block diagram illustrating signal flows in the signal processing circuit of FIG. 11.

FIG. 13 is an electrical circuit diagram illustrating the details of the computer circuits of FIG. 12.

DETAILED DESCRIPTION OF THE PREFERRED EMBODIMENT

Figure 1:
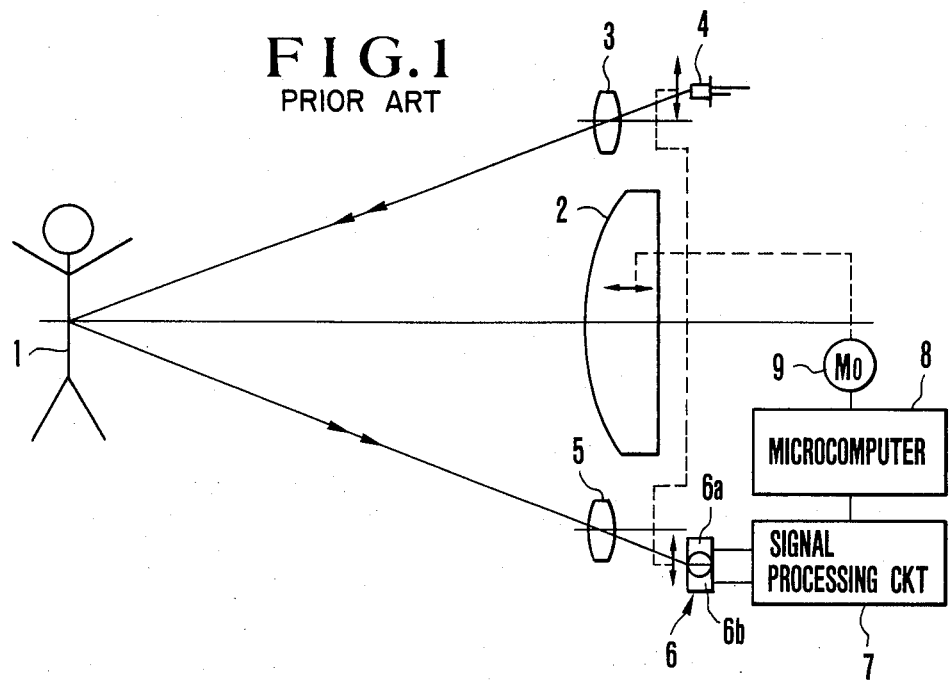
FIG. 1 is a schematic view of the main parts of the prior known difference active type range finder operating with light coming from the outside the photographic lens.
Figure 2:
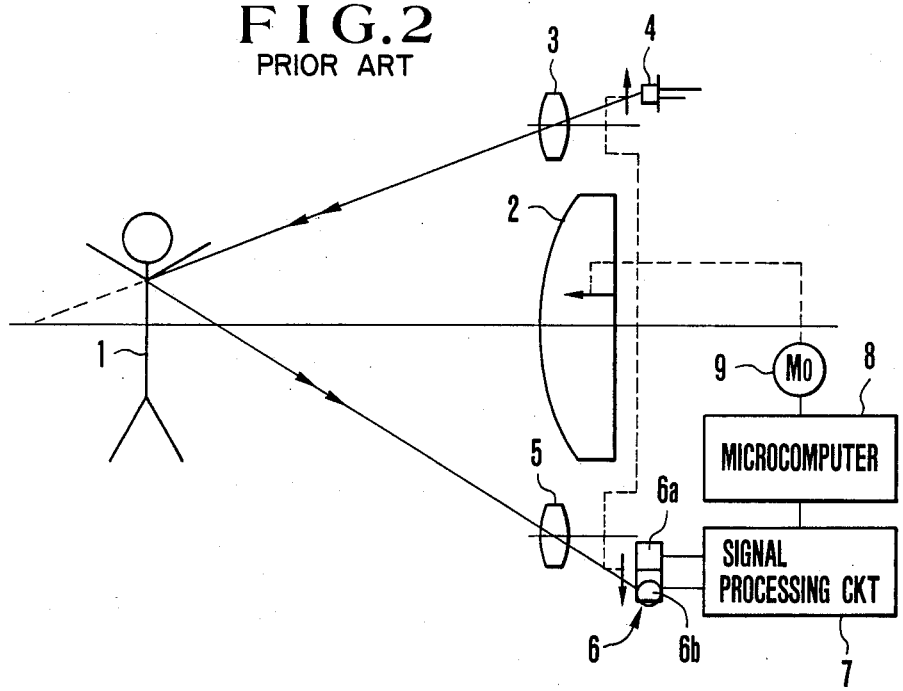
FIG. 2 is similar to FIG. 1 except that an out-offocus condition is illustrated.
Figure 3:
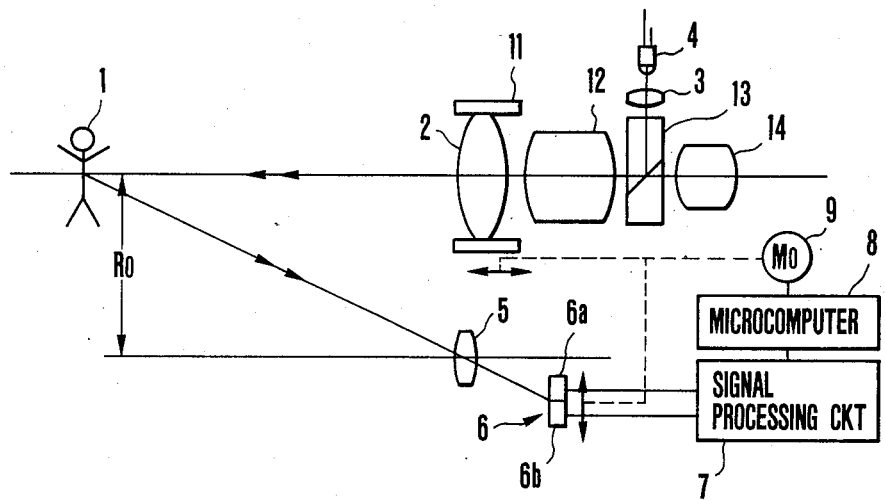
FIGS. 3 and 4 are schematic views of two examples of variation of the light arrangement of FIG. 1.
Figure 4:
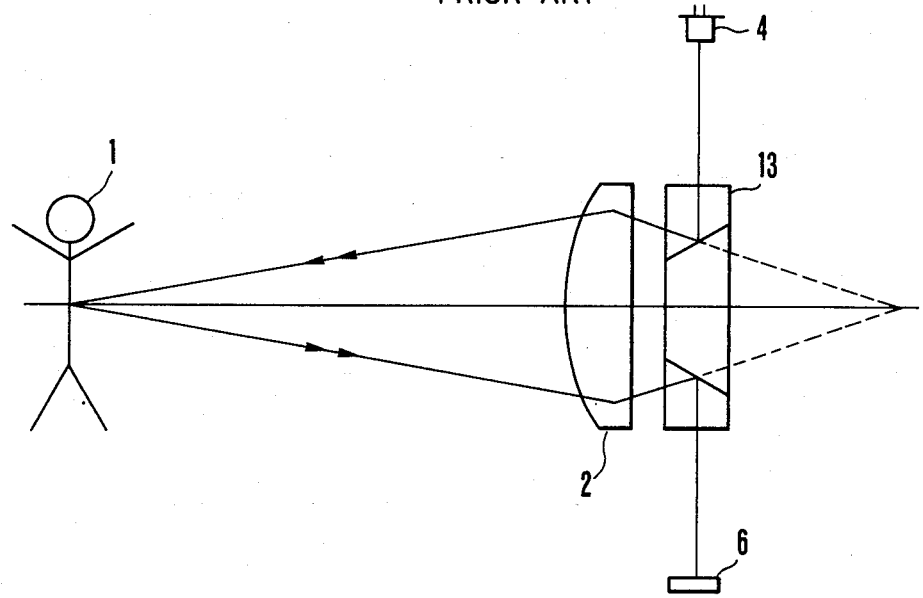
Figure 5:
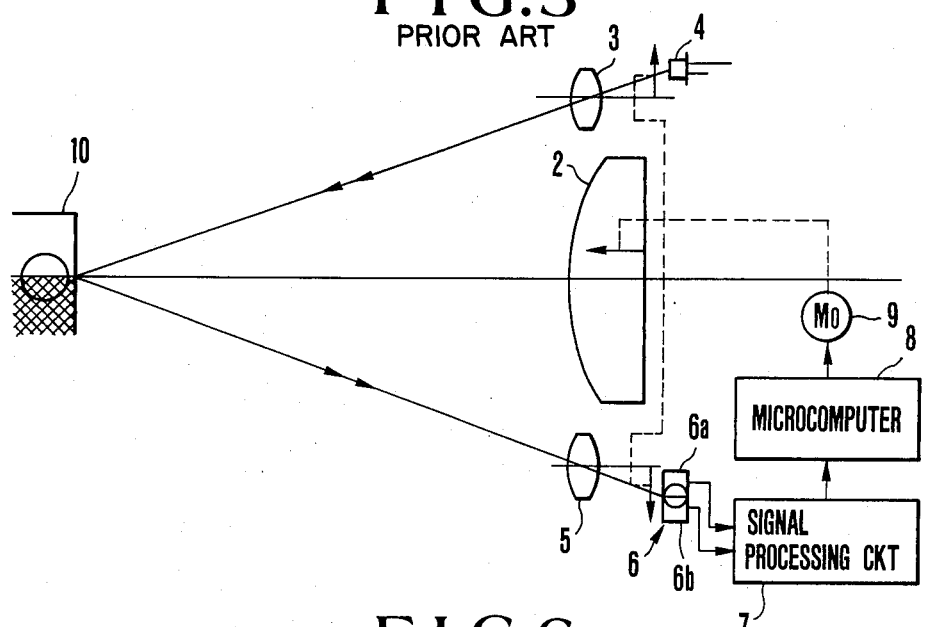
FIGS. 5 and 6 are similar to FIG. 1 except that how the contrast affects focusing is illustrated with FIG. 5 in the true in-focus position and with FIG. 6 in a false in-focus position.
Figure 6:
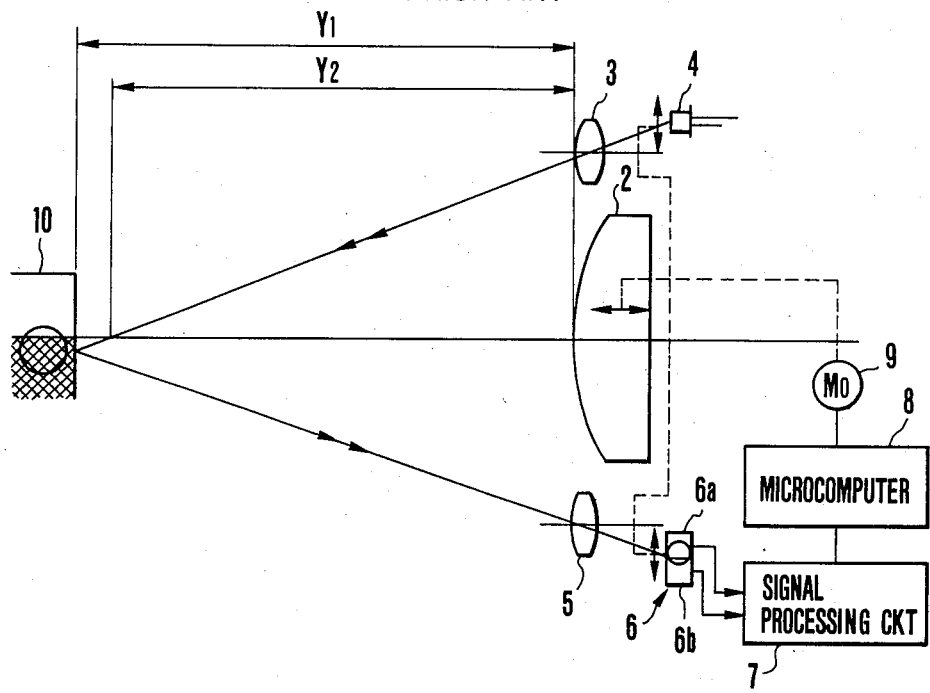
Figure 7A:
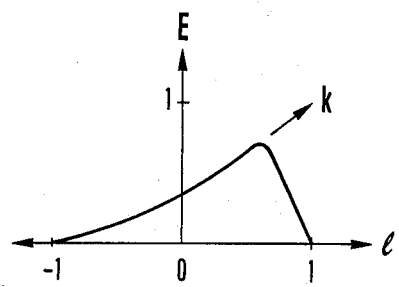
FIGS. 7(a) to 7(g) and FIGS. 8 (a) and 8(b) are diagrams for explaining the principle of focusing adjustment in accordance with contrast variation.
Figure 7B:
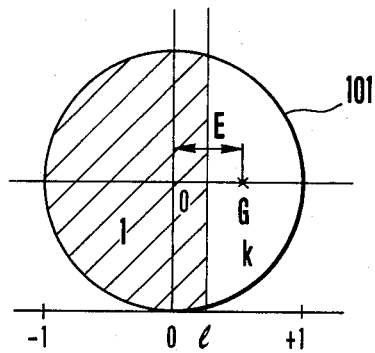
Figure 7C:
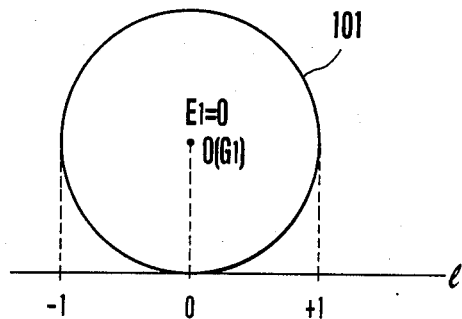
Figure 7D:
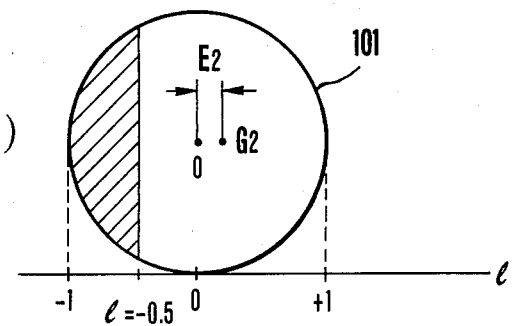
Figure 7E:
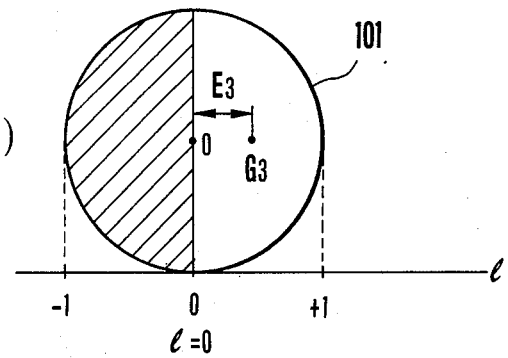
Figure 7F:
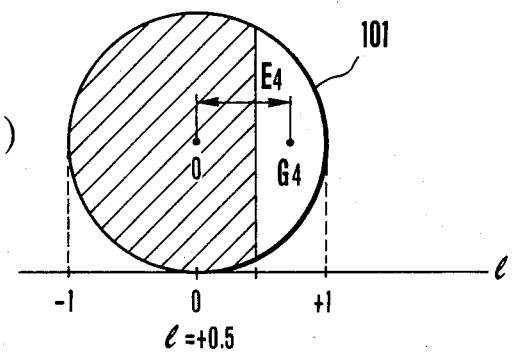
Figure 7G:
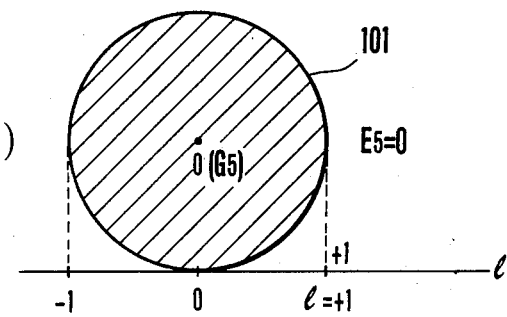
Figure 8A:
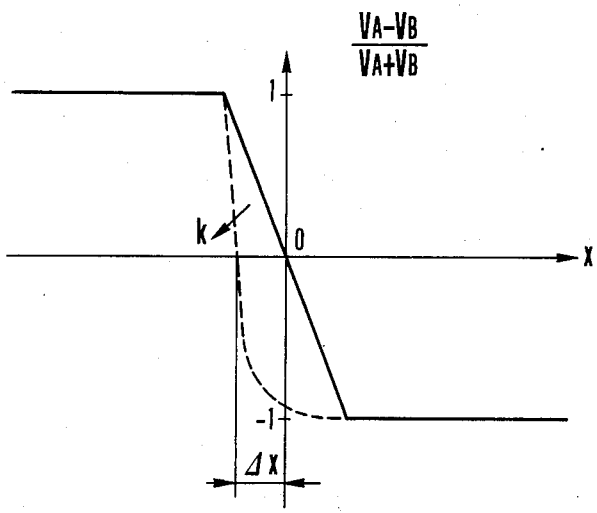
Figure 8B:
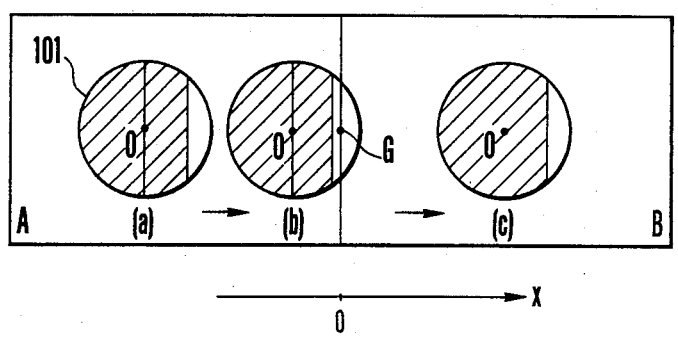
Figure 9A:
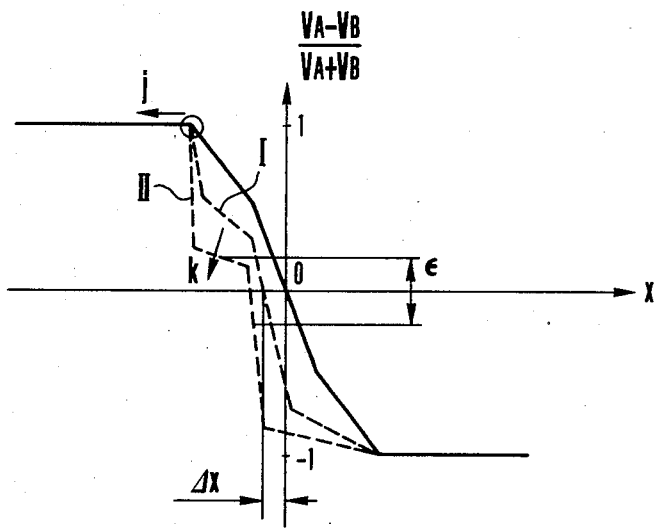
FIGS. 9 (a) to 9(c) are diagrams considered to explain the effect of the invention of improving the contrast defocusing.
Figure 9B:
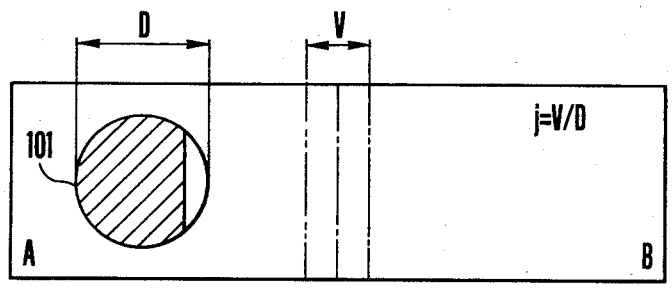
Figure 9C:
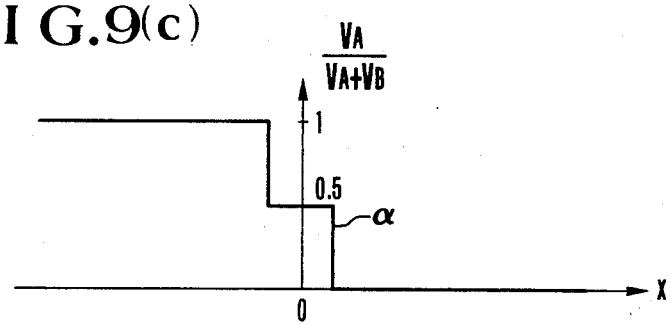

In a preferred embodiment of the invention, operation as the sensor use is made of a single SPC element having three image receiving areas formed therein. Instead of this, it is of course possible to use three elements of different image receiving areas from each other but arranged in such relation as to be equivalent to the three image receiving areas of the single SPC. In the following, by reference to the drawings, the embodiment of the present invention is described. FIGS. 9(a) to 9(c) illustrate a practical example of the sensor of the invention, and its construction is different from that of the prior known sensor shown in FIG. 8 in that the sensor domains A and B are spaced apart from each other to accommodate a signal crosstalk zone therebetween. In FIG. 9(b) this zone has a width V, and the circular spot image has a diameter D. As the spot image sweeps the sensor domains A and B in a direction indicated by arrow x in FIG. 9(b), the value of $VA/(VA+VB)$ varies as shown by a characteristic curve $\alpha$ in FIG. 9(c). The characteristic indicated by $\alpha$ appears in a case that when the spot image lies in the crosstalk zone, the signal representing the spot image is equally or 50% distributed between the sensor domain A and the sensor domain B. In this case, variation of the same function or $(VA-VB)/(VA+VB)$ as that shown in FIG. 8(a) becomes as shown in FIG. 9(a). Here, the ratio of the zone width V to the spot image diameter D is taken at $j=0.5$. A solid line curve of FIG. 9(a) represents a spot image of uniform contrast, and a dashed line curve I represents another spot image of the same contrast pattern as that of FIG. 8(a) or $1 \approx 0.6$, $k=8$. Because of the presence of the crosstalk zone, the value of $\Delta x$ is reduced to about one half of that when the crosstalk zone is not used. As the value of j increases (or approaches unity), the absolute value of x at which the value of $(VA-VB)/(VA+VB)$ starts to change from unity increases as shown in FIG. 9(a). When $j=1$, the gradient of variation of $(VA-VB)/(VA+VB)$ across the X-axis becomes gentler. That is, the sensitivity of the range finder is lowered. $\epsilon$ of FIG. 9(a) represents an allowable blind zone for the range finder. The gradient at the zero cross of $(VA-VB)/(VA+VB)$ must take an almost equal value to that when the sensor has no crosstalk zone at least within this blind zone $\epsilon$. In other words, there is an allowable maximum value of j. Next, as the value of k increases, another characteristic appears as shown by a dashed line curve II. Then, if the blind zone is zero, there is no problem. But to assure good stability of focusing adjustment near or at the in-focus condition, $\epsilon$ has to have a certain appreciable value. If so, as the spot image moves from the minus side, the error of distance measurement is rather greater than when the crosstalk zone is not used. (This phenomenon is hereinafter called the "enlarging" effect). This error increases with increase in j. In this respect also, there is an optimum value of j. But few real objects take such large values. Therefore, in actual practice, the influence of this error may be said to be negligible.

As has been described above, instead of using the 2-domain sensor as in the prior art, a central domain of width V is further included as shown in FIG. 9(b), and the output of the central domain after having been halved is added to each of the outputs of the flanked domains A and B thereby the range of focusing misadjustment by the contrast is reduced. Determination of a value of j is made based on the maximum value of the contrast ratio the latter of which is determined for actual use by taking into account for example, the range of at random variation of the diameter D of the spot image, the frequency of shootings, and the design concept.

Figure 10:
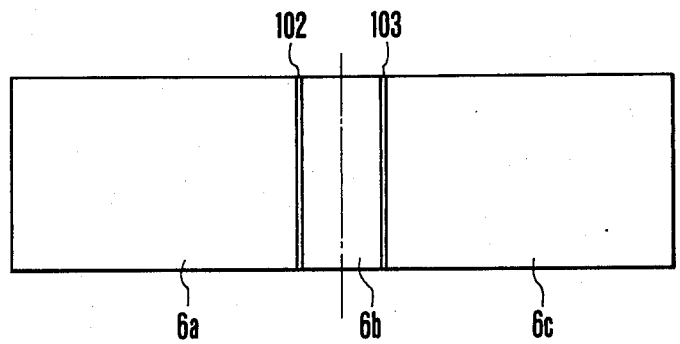
FIG. 10 is a plan view of an embodiment of a sensor according to the invention.

FIG. 10 illustrates an arrangement of image receiving areas of the sensor based on the above-described principle. Differing from the 2-domain sensor described in connection with the prior art, the sensor of the invention has three domains 6a, 6b and 6c arranged so as to produce respective outputs. 102 and 103 are boundary lines between the successive two domains.

Figure 11:
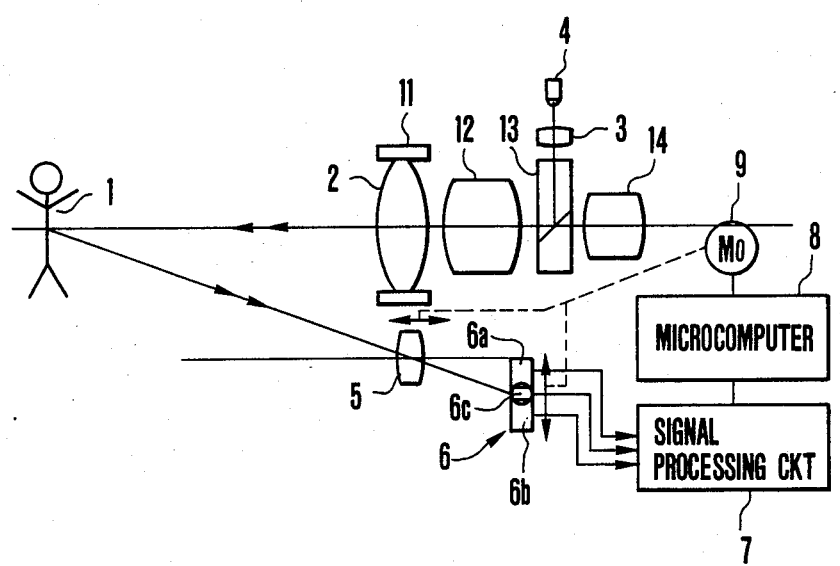
FIG. 11 is a schematic view of an example of application of the invention to the auto-focus camera of the type shown in FIG. 3.

FIG. 11 illustrates an embodiment of the invention applied into the difference active type range finder where the sensor 6 is divided to three domains 6a to 6c of which the outputs are treated by a signal processing, circuit 7 and a microcomputer 8. The microcomputer is of known construction in the art and is no longer explained.

FIG. 12 in block diagram illustrates a concrete example of the signal processing circuit 7 of FIG. 11. As described above, the central domain 6c of the sensor 6 produces an output Vc which is then divided into two halves for addition with the outputs VA and VB of the flanked domains 6a and 6b respectively. To obtain signals representing $VA+VC/2$ and $VB+VC/2$ there are provided a dividing circuit 104 and two adding circuits 105 and 108. These two signals are amplified by respective preamplifiers 106 and 109 and then detected and integrated by respective synchronous amplifiers 107 and 110. By these treatments, the faint electrical signals obtained from the sensor (for example, SPC) are amplified in the form free from the alternating current noise and then digitized by an A/D converter 111. The A/D converter 111 is designed in such a way that, depending on the system design of the range finder, besides the comparing operation with VA+VC/2 and VB+VC/2, there are performed additional comparing operations with the result of that computation and a number of preset reference levels. Their results are then transferred to the microcomputer 8, where the three focusing conditions, namely, near-focus, far-focus and in-focus conditions, are discriminated from one another. The output of the microcomputer 8 is applied to a motor drive circuit 112, thereby a focusing control motor 9 is driven to rotate in either direction until the in-focus condition is established. For note, the details of the microcomputer may be similar to those described in connection with the embodiment of FIG. 9 and those that follow in U.S. patent application Ser. No. 603,660 filed Apr. 26, 1984 assigned to the assignee of the present invention.

FIG. 13 illustrates a practical example of the computer circuits 104, 105, 108 shown in FIG. 12, wherein the output from the central domain 6c of the sensor 6 after having been converted to a voltage VC by an operational amplifier 115 is divided into two halves which are then added to the outputs VA and VB of the flanked domains 6a and 6b respectively by adders 117 and 118.

For note, the circuit shown in FIG. 13 merely exemplifies one of the possible forms of the computer circuit shown in FIG. 12. Therefore, it goes without saying that any other form may be employed.

As has been described above, in the present invention, the automatic focusing adjustment device of the difference active type which has so far been constructed with the 2-domain sensor is provided with a third domain of appropriate width intervening between the first two domains whereby the output of this additional domain is added to each of the outputs of the flanked domains to obtain two signals. The later treatment of these signals may be carried out in a manner known in the art to form automatic focusing adjustment. The use of such simple means provides a possibility of improving the reliability of focusing adjustment of which the dependency on the contrast variation constitutes the fundamental drawback of the difference active type range finder. When combined with the above-described merits of this type range finder, this improvement gives a great advantage to the automatic focusing adjustment device.

Though the foregoing embodiment has been described in connection with the output of the third domain which is halved before the adding operation is performed, it is not always necessary to halve, and another appropriate value may be employed depending on the photographic situations which may be often encountered, the focal length of the photographic lens, and many other conditions.

What is claimed is:

1. An automatic focusing adjustment device comprising:
   (a) means for projecting a distance measuring light beam onto an object to be photographed;
   (b) photosensitive means having three domains in a light receiving surface thereof, a central domain and two flanked domains;
   (c) means for dividing a signal from said central one of the three divided domains of said photosensitive means;
   (d) first and second adding means for adding an output signal from said dividing means to signals of said flanked domains of said photosensitive means; and
   (e) means for detecting a focusing control signal based on an output signal of said first and second adding means.

2. An automatic focusing adjustment device, wherein said central domain has a width which is smaller than a diameter of a spot of reflected light from said object.

* * * * *